United States Patent [19]
Lott

[11] Patent Number: 4,546,783
[45] Date of Patent: Oct. 15, 1985

[54] APPARATUS FOR WASHING DRILL CUTTINGS

[75] Inventor: W. Gerald Lott, Houston, Tex.

[73] Assignee: Flo Trend Shares, Inc., Houston, Tex.

[21] Appl. No.: 536,942

[22] Filed: Sep. 27, 1983

Related U.S. Application Data

[63] Continuation-in-part of Ser. No. 490,671, May 2, 1983, abandoned.

[51] Int. Cl.$^4$ .............................................. B01D 21/10
[52] U.S. Cl. ...................................... 134/109; 175/66
[58] Field of Search .......................... 134/109; 175/66; 366/165

[56] References Cited

U.S. PATENT DOCUMENTS

| | | | |
|---|---|---|---|
| 2,148,998 | 2/1939 | Sackett | 366/165 |
| 3,303,895 | 2/1967 | Fontenot | 175/66 |
| 3,765,430 | 10/1973 | Muller | 134/109 |
| 3,860,019 | 1/1975 | Teague | 134/109 |

FOREIGN PATENT DOCUMENTS 2705501 8/1978 Fed. Rep. of Germany ...... 366/165

OTHER PUBLICATIONS

The Brandt Co. Brochure.
Polycon, Inc. Brochure.
Vaughan Brochure.
Nagaoka Brochure (p. 14).

Primary Examiner—Stephen Marcus
Assistant Examiner—Renee S. Kidorf
Attorney, Agent, or Firm—Pravel, Gambrell, Hewitt & Kimball

[57] ABSTRACT

An apparatus for cleansing a stream of drilling fluid fouled drill cuttings having a housing divided into a plurality of compartments each designed to retain cleansing fluid. A spinning force is imparted into the incoming fouled drill cuttings in an inlet chamber wherein cleansing fluid is intimately mixed with the fouled drill cuttings. A decanting chamber removes liberated drilling fluid from the cuttings and disposes of such drilling fluid from the apparatus via a drain trough assembly. The underflow from the decanter is passed through a solids concentrating assembly wherein the coarse solids are deposited in a concentrating assembly bottoms chamber wherein the settled drill cuttings are removed from the apparatus. The overhead stream from the solids concentrating assembly is directed to a second decanter for removal of any remaining drilling fluid and fine drill cuttings entrained therein from the apparatus via the drain trough assembly. The remaining fluid in the concentrating assembly bottoms chamber is recirculated to the second decanting chamber and the inlet chamber.

29 Claims, 5 Drawing Figures

APPARATUS FOR WASHING DRILL CUTTINGS

This application is a continuation-in-part of an earlier application, Ser. No. 490,671 filed May 2, 1983 entitled Method and Apparatus for Washing Drill Cuttings by Applicant W. Gerald Lott, now abandoned.

FIELD OF THE INVENTION

The field of the present invention relates generally to an apparatus for washing adherent drilling fluids from drill cuttings.

BACKGROUND OF THE INVENTION

In oil well drilling operations, drilling fluid is circulated downwardly through the drill string to wash cuttings away from the drill bit. A mixture of drilling fluid and cuttings is returned to the surface through an annulus. "Adherent drilling fluid" is defined as drilling fluid adhering to the drill cuttings, and, if the drilling fluid is oil-based, the adherent drilling fluid includes oil.

It is well known that the drill cuttings must be separated from the drilling fluid so that the drilling fluid can be recirculated. Additionally, solid cuttings generated in a drilling process, such as during the exploration for oil and gas, which have been contaminated with adherent drilling fluid must be cleansed to remove surface contaminates prior to discharge of the cuttings to the environment. Such apparatuses are particularly beneficial in the laundering or cleansing of drill cuttings on offshore drilling platforms so that the drill cuttings are environmentally safe for discharge to the sea.

One known apparatus utilizes two separate cells each having a low speed agitator to stir a mixture of drill cuttings and cleansing solution. Initially, the drill cuttings are discharged into the first cell containing a surfactant solution and are slowly agitated to mix the surfactant and the drill cuttings together so as to wash the adherent drilling fluid from the drill cuttings. An underflow from this first cell communicates a slurry of surfactant rich with drill cuttings to a second cell containing a solution of surfactant where it is again slowly agitated and further adherent drilling fluid is washed from the drilling cuttings. Thereafter, a slurry of further cleansed drilling cuttings and surfactant is pumped from the second cell to a screening chamber, whereby the surfactant is returned to the system and the cleansed drill cuttings are discharged. Additionally, a portion of the surfactant solution rich in fine drill cuttings and adherent drilling fluids is run through a hydrocyclone separator which discharges the fine drill cuttings along with the larger cleansed drill cuttings.

Such apparatus is believed to lose a portion of the surfactant solution during operation. For example, it is believed such apparatus, which may have hydrocyclone separators with a capacity of one hundred gallons per minute, will lose approximately 4 gallons per minute or 560 gallons per day of surfactant solution. In addition to being environmentally undesirable to discharge this surfactant, the loss of this amount of surfactant is extremely expensive.

SUMMARY OF THE INVENTION

The cutting washer apparatus of the present invention includes a housing mounted on a base, the housing having a plurality of chambers each designed to retain liquids. The incoming drilling fluid contaminated drill cuttings enter into an inlet chamber wherein centrifugal force combined with cleansing fluid sprays act to intimately mix the drilling fluid fouled drill cuttings with the cleansing fluid. The mixture enters first open top cylindrical decanter where air spargers are used to aid the liberated drilling fluid to float to the surface. The drilling fluid overflows the top of the cylindrical decanter and is collected in a drain trough assembly for disposal from the apparatus. A sump pump is used to pump the cleansing fluid with the drill cuttings from the bottom of the cylindrical decanter into a plurality of hydrocyclones.

The bottoms flow from the hydrocyclones enters a concentrating assembly bottoms chamber. The concentrating assembly bottoms chamber is fitted with a vacuum pump which pulls a vacuum on a screen on the bottom of the chamber thereby attracting the drill cuttings. A drag link conveyor scrapes the surface of the screen and removes the accumulated drill cuttings from the apparatus.

The filtered cleansing fluid is stored in a cleansing fluid surge chamber. A recirculation pump returns the stored cleansing fluid into the inlet chamber as well as a second decanter.

Overhead flow from the hydrocyclones which may contain some entrained fine drill cuttings is directed into a second decanter. A combination of gas spargers and liquid spray nozzles (using cleansing fluid recirculated from the cleansing fluid surge chamber) are employed to aid any remaining drilling fluid or fine drill cuttings entrained therein to float to the liquid surface. The drilling fluid and entrained fine drill cuttings overflow the second decanter into the drain trough assembly for removal from the apparatus. Before leaving the apparatus, the decanted drilling fluid passes through a defrothing chamber.

The summary is a concise description of the cuttings washer and is not intended to limit or modify the scope of the invention as outlined in the claims.

DESCRIPTION OF THE PREFERRED EMBODIMENT

Figure 3:
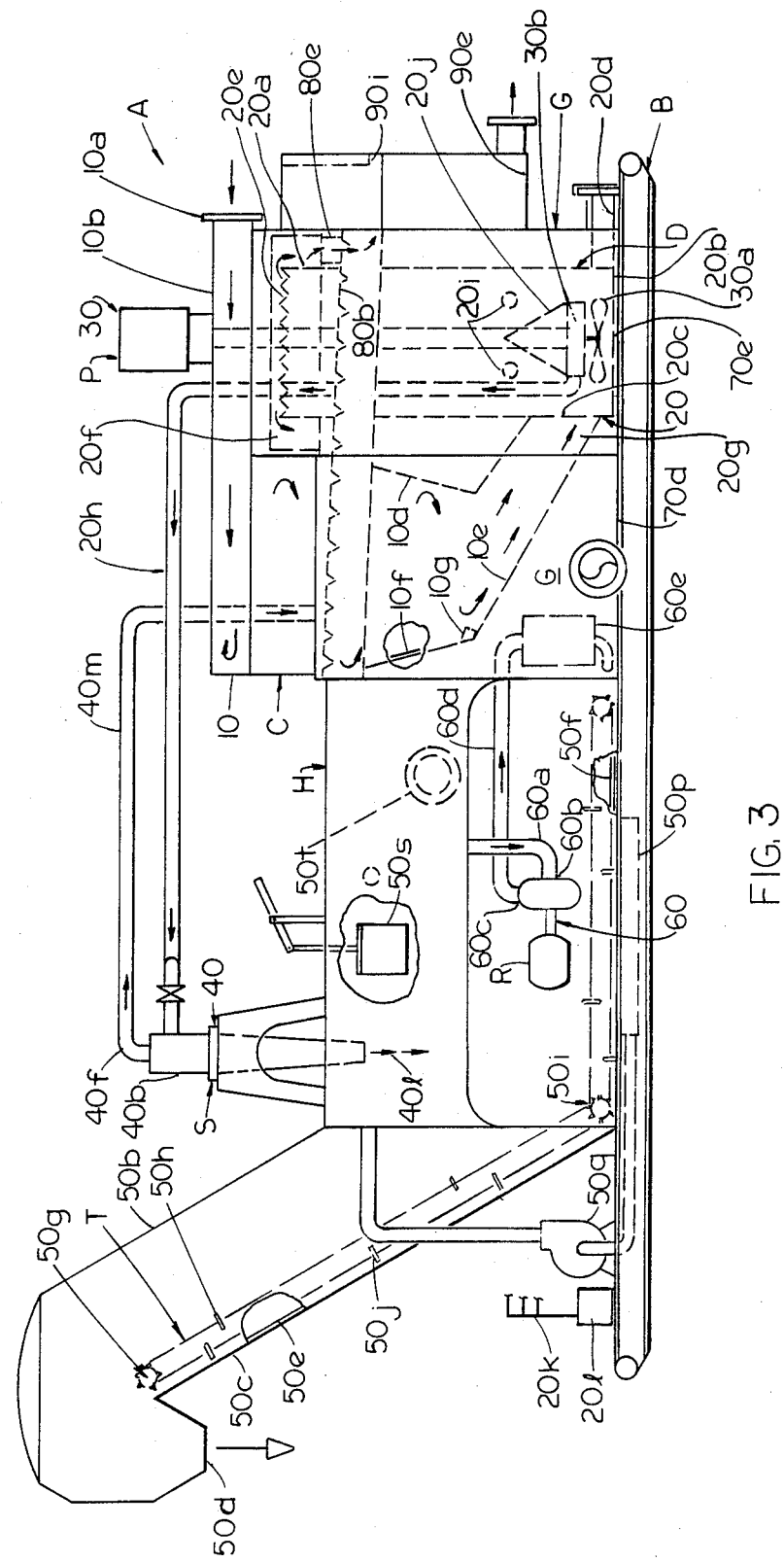
FIG. 3 is a front elevation view taken along line 3—3 of FIG. 1.

As shown in FIG. 3, the apparatus, generally designated A, is supported on a base B. The apparatus A includes a housing H which is divided into compartments C-1, C-2, C-3, C-4 and C-5 as will be more fully discussed hereinbelow. Each compartment within the housing is designed to be liquid tight so that it may hold an initial charge of a cleansing fluid F. For the purposes of clarity, fluid movement has been represented by arrows and it is to be understood that each of the compartments within the housing H contains an initial charge of cleansing fluid F.

The cuttings washer apparatus A comprises several subassemblies: centrifugal means C; separating means S; first decanting means D; cuttings discharge means E; second decanting means G; pumping means P; recirculating means R; and drilling fluid discharge means V. These major subassemblies will be discussed in more detail hereinbelow.

Figure 1:
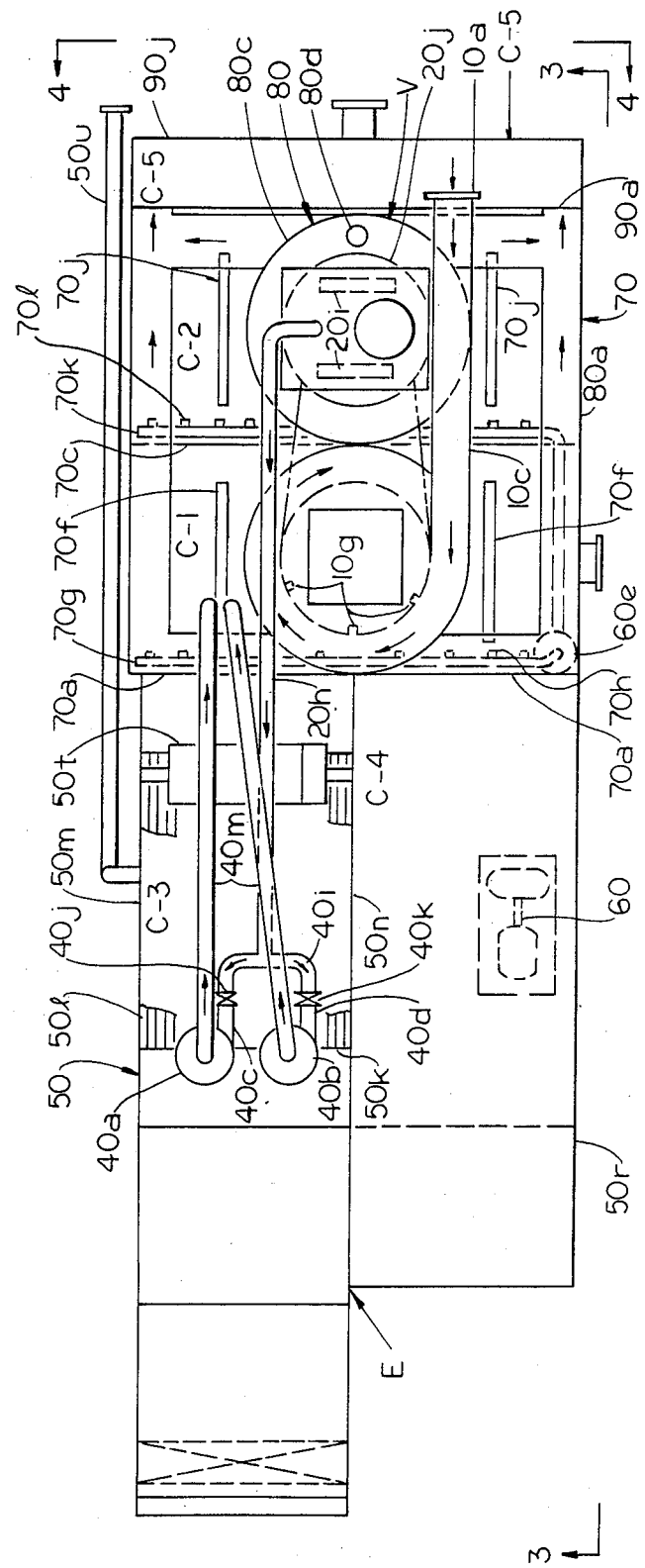
FIG. 1 is a plan view illustrating the layout of chambers in the apparatus and the fluid flow between said chambers.
Figure 2:
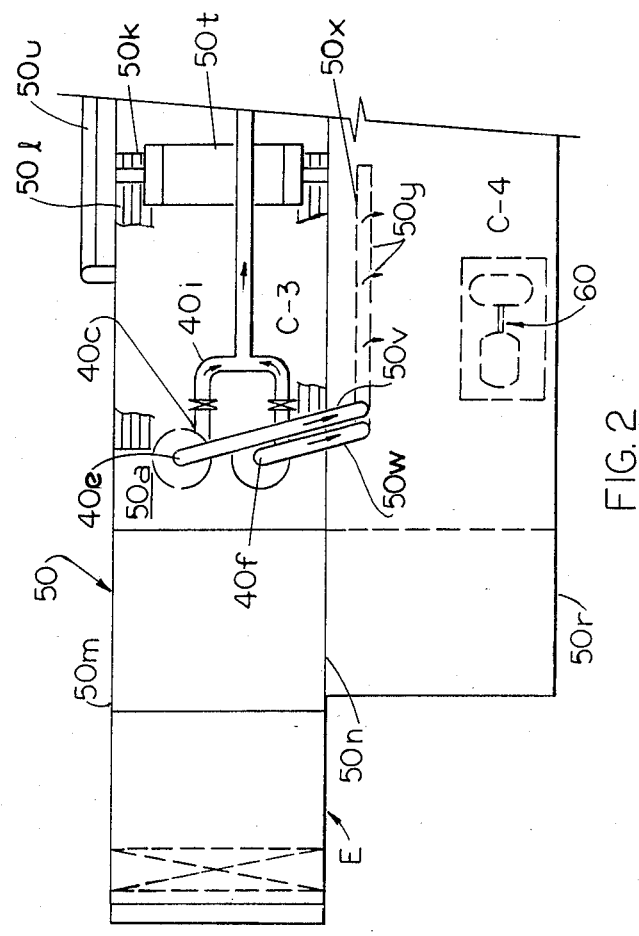
FIG. 2 is a partial plan view of the apparatus showing an alternate embodiment of the overhead fluid stream from the liquid cyclone.

The housing H is generally rectangular in configuration as viewed form the top as in FIGS. 1 and 2. Each of the compartments C-1 through C-5 is formed of vertical walls which will be described specifically only to the extent such walls form adjustable weirs or otherwise require specific description. Drilling fluid contaminated drill cuttings are admitted to the cuttings washer apparatus A from a vibrating screen (not shown) or similar piece of drilling fluid purification equipment found adjacent to an operating drilling rig. Even after processing by conventional equipment associated with purification of drilling fluid, the drill cuttings discharged from such equipment, still contain an appreciable amount of drilling fluid adhered thereto. In order to dispose of the drill cuttings in an environmentally acceptable manner, the adherent drilling fluid and, in particular, any oil from oil based drilling fluids must be removed. The cuttings washer apparatus A is designed to remove adhering drilling fluid including oil from oil-based drilling fluids from drill cuttings.

The drill cuttings along with the drilling fluid adhering thereto, enter the apparatus into centrifugal means C. Centrifugal means C, also known as 10 (FIG. 3), has an inlet flanged connection 10a is adapted to be attached to a suitable conduit for directing the incoming drilling fluid fouled drill cuttings into the apparatus A. Inlet flange connection 10a is connected to a conduit 10b having a square or rectangular cross-section.

Conduit 10b forms a tangential fluid inlet 10c (FIG. 1) which directs the fouled drill cuttings into an inlet chamber having a frusto-conically shaped upper segment 10d and a sloping, lower outlet segment 10e. The frusto-conically shaped upper segment 10d and sloping lower segment 10e are located in compartment C-1. As previously stated, the inlet chamber has a tangential inlet 10c. The frusto-conical shaped upper segment 10d and the sloping outlet segment 10e have a liner 10f which is preferably an olephilic material which has an affinity to oil. The affinity of the resilient liner 10f to oil helps in separating the adhered drilling fluid from the drill cuttings by drawing oil in the fouled drill cuttings toward the walls of the upper segment 10d and the sloping outlet segment 10e.

The use of the tangential inlet 1Oc imparts a spinning force on the incoming drilling fluid contaminated drill cuttings which in turn begin a spirally descending path along the walls of the frusto-conical shaped upper segment 10d. At the juncture between the upper segment 10d and the sloping outlet segment 10e are three nozzles 10g. The nozzles 10g are mounted in the wall of the upper segment 10d and oriented radially inward toward a central vertical axis of upper segment 10d. The nozzles 10g are also oriented downwardly at approximately the same angle as sloping outlet segment 10e. Recycled cleansing fluid is pumped through nozzles 10g as will be more fully discussed hereinbelow. The purpose of nozzles 10g is to mix cleansing fluid with the incoming drilling fluid contaminated drill cuttings thereby separating the drilling fluid and its contaminates such as oil from the drill cuttings. The nozzles 10g have an additional purpose of urging the drill cuttings downwardly along sloping outlet segment 10e and into the first decanting means D.

Figure 4:
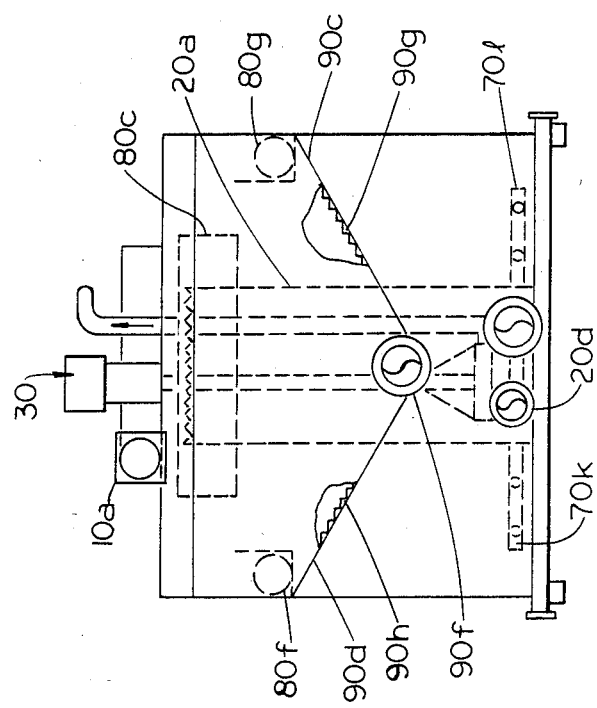
FIG. 4 is a side elevation view taken along line 4—4 of FIG. 1 with some details removed for clarity.

First decanting means D is an open topped cylinder 20 forming a chamber 20a located in compartment C-2. Cylinder 20 has a bottom 20b and a radial inlet 20c adjoining bottom 20b. Sloping outlet segment 10e is connected to radial inlet 20c. The decanting cylinder 20 has a drain connection 20d (FIGS. 3 and 4) which is kept normally closed. A continuous serration 20e is formed at the top of cylinder 20.

Decanting cylindrical chamber 20a has two exit flows. An overflow stream represented by arrow 20f spills over the continuous serration 20e and is removed from the apparatus by drilling fluid discharge means V, as more fully described hereinbelow. The overflow stream contains drilling fluid separated from the drill cuttings as well as any fine drill cuttings entrained therein. The heavier drill cuttings along with cleansing fluid C gravitate toward the bottom 20b of cylindrical decanting chamber 20a.

Pumping means P is a centrifugal type sump pump 30 whose suction is disposed adjacent to the bottom 20b of decanting cylindrical chamber 20a. Sump pump 30 provides the motive force for withdrawing an underflow stream 20g from cylindrical decanting chamber 20a. Before the cleansing solution along with accumulated drill cuttings and any drilling fluid adhering to them can enter sump pump 30, a chopping mechanism 30a breaks up the large drill cutting segments into smaller segments. This chopping action not only reduces drill cutting size to avoid damaging the sump pump 30, but also creates additional surface area on the drill cuttings thereby allowing the cleansing solution to continue to free any drilling fluid still entrained in the drill cuttings. One such pump is manufactured by Vaughan Company.

A pair of gas spargers (FIGS. 1 and 3) 20i are disposed in the same horizontal plane on either side of sump pump 30 within chamber 20a. Compressed gas, typically air, is introduced into cylindrical decanting chamber 20a through gas spargers 20i thereby forming rising bubbles. The rising bubbles attach themselves to drilling fluid in cylindrical decanting chamber 20a and help bring drilling fluid to the serration edge 20e at the top of cylindrical decanting chamber 20a. In order to avoid cavitating the sump pump 30 by having gas bubbles enter its suction, a downward expanding conically shaped shroud 20j is disposed between gas spargers 20i and pump suction connection 30b. The gas propelled through gas spargers 20i may be compressed air or any other suitable compressible fluid. Frequently, compressed air is available at rig side and can be connected to a manifold 20k provided with the apparatus. For the user's convenience, a blower 20l provides a compressed air source for spargers 20i.

Figure 5:
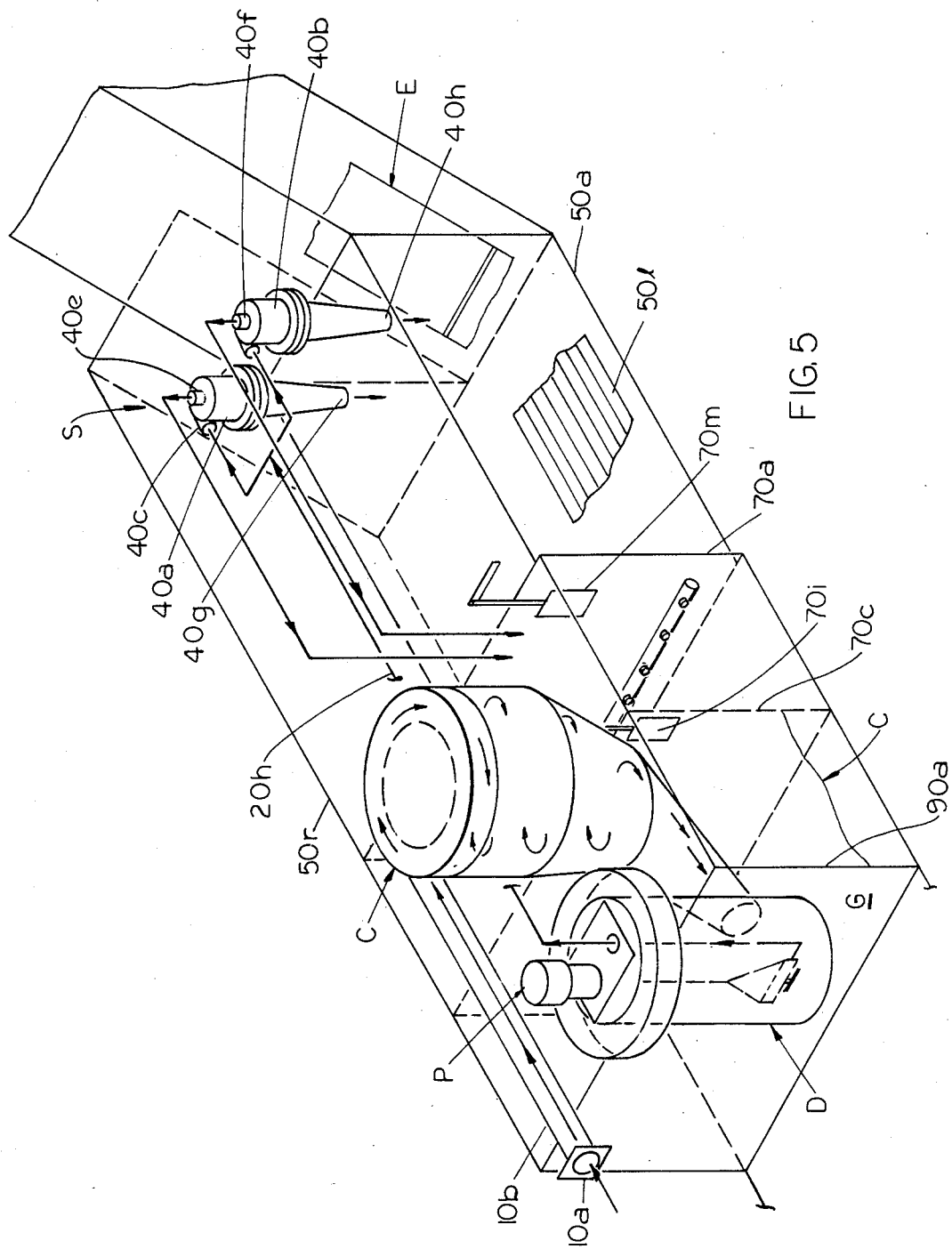
FIG. 5 is an isometric, part schematic view of the apparatus illustrating some of the major flow paths within the apparatus with some details removed for clarity.

The underflow stream 20g is in flow communication with separating means S via sump pump 30 through piping 20h. As stated earlier, underflow stream 20g from cylindrical decanting chamber 20a contains cleansing fluid as well as drill cuttings of varying size as well as any drilling fluid still adhering to the drill cuttings. The purpose of the separating means S is to separate the incoming decanted underflow stream 20g into two streams wherein one stream contains the bulk of the drill cuttings and the other contains the remaining very fine drill cuttings. The separating means S contains a solids concentrating assembly 40. In the preferred embodiment, solids concentrating assembly 40 is comprised of two liquid cyclones 40a and 40b (FIGS. 1, 2 and 5). Liquid cyclones 40a and 40b are frequently referred to by those skilled in the art as "hydrocyclones" and are devices for separating solids from liquids using centrifugal force, said devices being well known in the art. Cyclone 40a has an inlet port 40c and cyclone 40b has an inlet port 40d. Cyclone 40a has an overhead outlet 40e and cyclone 40b has an overhead outlet 40f. Cyclone 40a has a bottoms outlet 40g and cyclone 40b has a bottoms outlet 40h (FIG. 5). An inlet manifold 40i connects inlet ports 40c and 40d. Valve 40j is located adjacent inlet port 40c and valve 40k is located adjacent inlet port 40d. Accordingly, through the use of valves 40j and 40k, incoming decanting underflow stream 20g can be directed to either cyclone 40a or 40b individually or both cyclones 40a and 40b simultaneously. Since the cleaning efficiency of cyclones 40a and 40b is greatly dependent on the incoming velocity of decanting underflow stream 20g, valves 40j and 40k allow additional flexibility in the cutting washer apparatus A of the present invention to handle varying circulating rates while still retaining its separating efficiency.

As stated earlier, the heavier or coarse drill cuttings (along with any drilling fluid still adhered thereto) as well as a liquid portion of the decanting underflow stream 20g, exit through bottoms outlets 40g and 40h, and constitute the bottoms fluid stream designated by arrow 40l from the solids concentrating assembly 40. The very fine drill cuttings along with the bulk of the liquid portion of the decanting underflow stream 20g which enter solids concentrating assembly 40, exit the assembly 40 from overhead outlets 40e and 40f as overhead fluid stream in conduits 40m (FIG. 3). The disposition of overhead fluid stream 40m will be discussed in more detail hereinbelow.

Bottoms fluid stream 40l falls by gravity into cuttings discharge means E which is located in compartment C-3. The compartment C-3 forms a concentrating assembly bottoms chamber 50 disposed directly below bottoms outlets 40g and 40h of the solids concentrating assembly 40. The concentrating assembly bottoms chamber 50 has a horizontally disposed bottom 50a and an upwardly including rectangular housing 50b having a sloped bottom 50c. Inclined housing 50b terminates in discharge chute 50d. A wear liner 50e covers sloped bottom 50c and a wear liner 50f covers horizontally disposed bottom 50a (FIG. 3). Removal means T, which is part of cuttings discharge means E is mounted in concentrating assembly bottoms chamber 50 and its upwardly extending housing 50b. Removal means T is a drag link conveyor 50g and is used to remove drill cuttings from the cutting washer apparatus A. Drag link conveyor 50g, a device well known in the art, is mounted along horizontally disposed bottom 50a and sloped bottom 50c. A plurality of flights 50h are connected to a chain and sprocket assembly 50i. Each flight 50h has a resilient wiper 50j attached thereto so that when chain and sprocket assembly 50i is driven by a variable speed motor (not shown) resilient wipers 50j scrape along wear liner 50f and wear liner 50e thereby removing settled drill cuttings from concentrating assembly bottoms chamber 50 by discharging them through discharge chute 50d.

Horizontally disposed bottom 50a of concentrating assembly bottoms chamber 50 has an elongated opening 50k (FIGS. 1, 2 and 3) which is covered by a fine mesh 50l (FIGS. 1 and 2). The fine mesh is installed flush with wear liner 50f and extends from vertical wall 50m to vertical wall 50n (FIG. 3). A plenum chamber 50p is connected to the underside of horizontally disposed bottom 50a and is adapted to enclose elongated opening 50k. A vacuum pump 50q is in fluid communication with plenum 50p and is used to lower the pressure in plenum 50p. Therefore, the combination of vacuum pump 50q and fine mesh 50l acts as a vacuum filter to retain drill cuttings along mesh 50l while at the same time filtering cleansing fluid through fine mesh 50l. The cleansing fluid drawn through fine mesh 50l and plenum chamber 50p enters vacuum pump 50q and is directed to cleansing fluid surge chamber 50r. In a preferred embodiment, the mesh 50l is a wedge type screen manufactured by Naggha Kanarmi Co., Ltd. of Osaka, Japan.

Compartment C-4 forms cleansing fluid surge chamber 50r adjacent to concentrating assembly bottoms chamber 50, which is compartment C-3. Vertical wall 50n is common to cleansing surge chamber 50r and concentrating assembly bottoms chamber 50. An adjustable weir 50s is disposed in vertical wall 50n, thereby allowing fluid communication between concentrating assembly bottoms chamber 50 and cleansing fluid surge chamber 50r. Adjustable weir 50s allows any drilling fluid accumulated as an upper liquid layer in cleansing fluid surge chamber 50r to be redirected to concentrating assembly bottoms chamber 50. An oil skimmer 50t, a device well known in the art, is disposed within concentrating assembly bottoms chamber 50 for removal of any accumulated upper layer of drilling fluids from the cutting washer apparatus A, via conduit 50u.

Recirculation means R is a horizontal centrifugal pump 60 disposed below cleansing fluid surge chamber 50r and secured to base B (FIGS. 1, 2 and 3). Conduit 60a is used to provide fluid communication between cleansing fluid surge chamber 50r and suction connection 60b on centrifugal pump 60. Centrifugal pump discharge connection 60c is connected to conduit 60d which is in turn connected to a manifold assembly 60e housed within second decanting means G. The second decanting means G is the area within compartments C-1 and C-2 outside of frusto-conical cylinder 10d and ramp 10e and separating cylinder 20 of the first decanting means. A connection, not shown, between manifold assembly 60e and nozzles 10g allows cleansing fluid from cleansing fluid surge chamber 50r to also be recirculated into frusto-conical shaped upper segment 10d for contact with the incoming drilling fluid fouled drill cuttings. It is understood that the placement of nozzles 10g is but the preferred alternative of several placement positions. For example, nozzles 10g may be placed in sloping outlet segment 10e or even in cylindrical decanting chamber 20a without departing from the spirit of the invention. Manifold assembly 60e is also connected to nozzles within second decanting means G as more fully discussed hereinbelow.

As revealed in the drawings, the overhead fluid stream 40m from solids concentrating assembly 40 can be directed to one of two locations. FIG. 1 shows overhead fluid stream 40m directed to second decanting means G through two pipes. In the alternative embodiment (FIG. 2), the overhead fluid stream 40m is directed to cleansing fluid surge chamber 50r.

Referring to FIG. 2, it is seen that conduit 50v extends from overhead outlet 40e and conduit 50w extends from overhead outlet 40f of liquid cyclones 40a and 40b, respectively. Both conduits 50v and 50w extend below the liquid level in cleansing fluid surge chamber 50r and can therefore be referred to as dip pipes. At least one of the dip pipes entering cleansing fluid surge chamber 50r (here, conduit 50v) has a capped horizontal extension 50x which further contains a plurality of horizontally disposed openings 50y. With the construction illustrated above, the combination of conduit 50v, capped horizontal extension 50x and horizontally disposed openings 50y, act to prevent any fine drill cuttings that may be present in cleansing fluid surge chamber 50r from settling to its bottom. With the agitation provided in cleansing fluid surge chamber 50r by the dip pipe assembly previously described, the fine drill cuttings, if any, are propelled to the liquid surface from where they can be directed to concentrating assembly bottoms chamber 50 via adjustable weir 50s. Having reintroduced the fine particles from cleansing fluid surge chamber 50r back into concentrating assembly bottoms chamber 50, there is yet another chance to remove such fines from the apparatus as the fines are attracted to fine mesh 50l. It should be noted that particles lodged on fine mesh 50l act as a filter aid and help in retaining fine drill cuttings on fine mesh 50l that would normally be small enough to pass through said fine mesh 50l.

In the alternative embodiment of FIG. 2, overhead fluid stream 40m from solids concentration assembly 40 is directed to second decanting means G. In the preferred embodiment, second decanting means G is a square decanting chamber 70 formed in compartments C-1 and C-2 adjacent to concentrating assembly bottoms chamber 50l (compartment C-3) and cleansing fluid surge chamber 50r (compartment C-4). It is understood that decanting chamber 70 may have other than a square shape without departing from the spirit of the invention. Common wall 70a is shared by decanting chamber 70 as well as concentrating assembly bottoms chamber 50 and cleansing fluid surge chamber 50r. Decanting chamber 70 has a vertical partition wall 70c parallel to common wall 70a which divides decanting chamber 70 into a primary subchamber 70d (compartment C-1) and a secondary subchamber 70e (compartment C-2) (FIGS. 1 and 3).

To minimize the overall size of the base B and the overall height of the cutting washer apparatus A, the frusto-conical upper segment 10d and the sloping outlet segment 10e are located substantially within primary subchamber 70d or compartment C-3. For similar reasons, cylinder 20 is located substantially in secondary subchamber 70e or compartment C-4. It is important to note that although cylinder 20 and upper segment 10d and sloping outlet segment 10e of the inlet chamber are located within primary and secondary subchambers 70d and 70e, there is no fluid communication between primary and secondary subchambers 70d and 70e with the chambers nested therein.

Primary subchamber 70d contains two gas spargers 70f horizontally disposed in the same plane and having a longitudinal axis parallel to the longitudinal axis of the base B. Gas spargers 70f generate gas bubbles which aid in bringing any remaining drilling fluid as well as any entrained very fine drill cuttings to the liquid surface. Gas spargers 70f are connected to manifold 20k. Primary subchamber 70d also contains a primary liquid spray nozzle assembly 70g disposed along the bottom of primary subchamber 70d along common wall 70a. Recirculating fluid from centrifugal pump 60 (via conduit 60d and manifold 60e) is pumped through a plurality of nozzles 70h located at spaced intervals along primary liquid spray nozzle assembly 70g. Nozzles 70h are disposed at varying distances from common wall 70a and thereby serve to agitate and mix recirculated cleansing fluid with any fine drill cuttings present in primary subchamber 70d. Therefore, it is the combined action of gas spargers 70f and liquid spray nozzle 70h that results in flotation of fine drill cuttings or droplets of drilling fluid present in primary subchamber 70d (compartment C-1).

Vertical partition wall 70c contains an adjustable weir 70i (FIG. 5) which permits flow between primary subchamber 70d and secondary subchamber 70e at preselected levels. Gas spargers 70j are disposed in secondary subchamber 70e in the same manner as gas spargers 70f are disposed in primary subchamber 70d and are connected to manifold 20k. Similarly, secondary subchamber liquid spray nozzle assembly 70k is disposed in secondary subchamber 70e adjacent to vertical partition wall 70c. Nozzles 70l are disposed along secondary subchamber liquid spray nozzle assembly 70k in a similar manner as the nozzles 70h. Therefore, it is a combination of gas sparging and liquid spray nozzle agitation in secondary subchamber 70e which helps to bring up any fine drill cuttings or droplets of drilling fluid to the liquid surface.

An adjustable weir 70m (FIG. 5) is located in common wall 70a between primary subchamber 70d and concentrating assembly bottoms chamber 50 thereby allowing fluid communication at preselected levels from primary subchamber 70d to concentrating assembly bottoms chamber 50 (FIG. 5). On occasions where there may be too many drill cuttings present in primary subchamber 70d and secondary subchamber 70e adjustable weir 70m can be used to recycle the drill cuttings back to concentrating assembly bottoms chamber 50 thereby affording another opportunity to retain the drill cuttings on fine mesh 50l and remove them from the cutting washer apparatus A via drag link conveyor 50g.

Having successfully decanted the drilling fluid and any entrained fines to the open tops of cylindrical decanting chamber 20a, primary subchamber 70d, and secondary subchamber 70e, it is desirable to efficiently remove the accumulated drilling fluid and entrained fines from the apparatus.

Drilling fluid discharge means V is used to conduct the decanted drilling fluid and any entrained fines from the cutting washer apparatus A. Drilling fluid discharge means V is a drain trough assembly 80. The drain trough assembly 80 further contains a rectangular drain trough 80a mounted on the inner periphery of primary subchamber 70d (compartment C-3) and secondary subchamber 70e (compartment C-4). Rectangular drain trough 80a is mounted near the upper ends of primary subchamber 70d and secondary subchamber 70e and has a bottom sloping downwardly from primary subchamber 70d toward secondary subchamber 70e. Drilling fluid and entrained fines from primary subchamber 70d and secondary subchamber 70e spill over the serrated inner wall 80b of rectangular drain trough 80a. Circular drain trough 80c is disposed around the outer surface of cylindrical decanting chamber 20a adjacent to its top. Overflow stream 20f spills over continuous serrations 20e and into circular drain trough 80c. Circular drain trough 80c is disposed at a higher elevation than rectangular drain trough 80a and partially overlays rectangular drain trough 80a. An opening 80d in the bottom of circular drain trough 80c permits drilling fluid and fines entrained therein to gravity flow from circular drain trough 80c to lower rectangular drain trough 80a via conduit 80e (FIG. 3). The accumulated fluid and entrained fines in rectangular drain trough 80a passes through two openings 80f and 80g (FIG. 4) and into a defrothing chamber 90 formed by compartment C-5.

The defrothing chamber 90, a part of the drilling fluid discharge means V, shares a common wall 90a with secondary subchamber 70e (compartment C-4). Defrothing chamber 90 includes sloped surfaces 90c and 90d which join together to form a valley 90e. A drilling fluid outlet 90f is provided adjacent to valley 90e for conducting accumulated drilling fluid and any fine drill cuttings entrained therein from the cutting washer apparatus A. Sloped surface 90c contains a progression of descending steps 90g and sloped surface 90d contains a progression of steps 90h. The progression of steps 90g begins on sloped surface 90c directly below opening 80g and continues to valley 90e. Similarly, the progression of steps 90h begins on sloped surface 90d directly below opening 80f and continues to valley 90e. A rectangular air vent 90i is disposed inside defrothing chamber 90 on outer wall 90j above drilling fluid outlet 90f. Air vent 90i allows entrained air to exit from the cutting washer apparatus A after it has been liberated due to the defrothing action of the progression of steps 90g and 90h within defrothing chamber 90.

In operating the cutting washer apparatus A an initial charge of cleansing fluid is placed in primary subchamber 70d (compartment C-1), secondary subchamber 70e (compartment C-2), cleansing fluid surge chamber 50r (compartment C-4), concentrating assembly bottoms chamber 50 (compartment C-3), and cylindrical decanting chamber 20a. It should be noted that by charging cylindrical decanting chamber 20a, sloping outlet segment 10e and frusto-conical shaped upper segment 10d will also be initially charged. As seen in FIGS. 3 and 5, drilling fluid contaminated drill cuttings are introduced into the cutting washer apparatus A through conduit 10b. A spinning motion is imparted to the incoming fluid stream while at the same time a jet of cleansing fluid from nozzles 10g is used to thoroughly mix cleansing fluid with the incoming drilling fluid contaminated drill cuttings. The entire flow is directed into open top cylindrical decanting chamber 20a where, with the assistance of gas spargers 20i, drilling fluid is decanted from the top of cylindrical chamber 20a and into circular drain trough 80c for ultimate disposal from the cutting washer apparatus A.

A sump pump 30 pumps the underflow stream 20g which includes the drill cuttings to liquid cyclones 40a and 40b. The bottoms fluid stream 40l from liquid cyclones 40a and 40b drops into concentrating assembly bottoms chamber 50. There, due to the action of vacuum pump 50q, the settling drill cuttings are retained on a fine mesh screen 50l located over an elongated opening 50k in the bottom of concentrating assembly bottoms chamber 50. Also, the drag link conveyor 50g wipes the retained drill cuttings from fine mesh screen 50l and carries them out of the cutting washer apparatus A. The fluid that passed through screen 50l is deposited in cleansing fluid surge chamber 50r for ultimate recycle via centrifugal pump 60.

The overhead fluid stream 40m is directed to primary subchamber 70d. In an alternative embodiment, overhead fluid stream 40m is directed to cleansing fluid surge chamber 50r. Primary subchamber 70d is in fluid communication with secondary subchamber 70e. A combination of gas spargers 70f and 70j and liquid spray nozzles 70h and 70l aid in bringing any drilling fluid or fine drill cuttings entrained therein to the liquid surface in primary subchamber 70d and secondary subchamber 70e. The drilling fluid and fine drill cuttings entrained therein overflow serrated inner wall 80b and run into rectangular drain trough 80a. Drilling fluid decanted from cylindrical decanting chamber 20a flows from circular drain trough 80c to rectangular drain trough 80a. The combined flow enters a defrothing chamber 90 before emerging from the drilling fluid outlet 90f of the cutting washer apparatus A.

The foregoing disclosure and description of the invention are illustrative and explanatory thereof, and various changes in the size, shape and materials, as well as in the details of the illustrated construction may be made without departing from the spirit of the invention.

I claim:

1. An apparatus for cleansing a stream of drilling fluid fouled drill cuttings with a cleaning fluid comprising:

a unitary base;

a housing, said housing having a plurality of chambers, said chambers adapted to retain liquid;

an initial charge of cleansing fluid in said housing;

an inlet chamber; said inlet chamber further formed of a substantially frusto-conical housing having:
 a fluid inlet port wherein drilling fluid fouled drill cuttings may be admitted to the apparatus;
 a first segment, said fluid inlet port connected to said first segment; and
 an oulet segment connected to said first segment, said first segment having nozzles therein to direct into said outlet segment a cleansing fluid;

a first decanting chamber formed of a substantially cylindrical housing having an open top, said first decanting chamber connected to said outlet segment of said inlet chamber; said first decanting chamber separating said fouled drill cuttings into heavy solids in substantially a cleansing solution and lighter solids in substantially drilling fluid;

a solids concentrating assembly, said solids concentrating assembly being in fluid communication with said first decanting chamber, said solids concentrating assembly formed having an overhead outlet, said solids concentrating assembly formed having a bottom outlet, and said solids concentrating assembly formed having an inlet;

a pumping means in fluid communication with the lower end of said first decanting chamber for transporting fluid containing drill cuttings from near the bottom of said first decanting chamber to said inlet of said solids concentrating assembly;

a second decanting chamber formed of a substantially rectangular housing having an open top said first decanting chamber and said inlet chamber being substantially nested within said second decanting chamber;

a concentrating assembly bottoms chamber, said bottoms chamber disposed below said solids concentrating assembly and in flow communication with said bottoms outlet of said concentrating assembly and having a horizontally disposed bottom;

removal means for removing accumulated drill cuttings near the bottom of said concentrating assembly bottoms chamber from the apparatus;

means for recirculating the remaining fluid in said concentrating assembly bottoms chamber to said second decanting chamber and said inlet chamber;

a drain trough assembly, said drain trough assembly mounted near the top of said first and second decanting chambers and disposed to receive decanted drilling fluid from said open tops of said first and second decanting chambers and conduct the drilling fluid accumulated therein from the apparatus.

2. The apparatus of claim 1 wherein said recirculating means recirculates the remaining fluid in said concentrating assembly bottoms chamber to only said second decanting chamber and said inlet chamber.

3. The apparatus of claim 1 further including:
a cleansing fluid surge chamber in said housing, said cleansing fluid surge chamber disposed adjacent said concentrating assembly bottoms chamber and having a common wall there between;
a first adjustable weir, said first adjustable weir disposed in said common wall thereby permitting, at preselected fluid levels, flow communication between said cleansing fluid surge chamber and said concentrating assembly bottoms chamber; and
said recirculating means recirculates fluid only from said clean fluid surge chamber to said second decanting chamber and said nozzles in said first segment of said inlet chamber.

4. The apparatus of claim 3 wherein said recirculating means recirculates fluid from said cleansing fluid surge chamber to only said second decanting chamber and said inlet chamber.

5. The apparatus of claim 3 wherein:
said cleansing fluid surge chamber contains at least one dip pipe; and
said concentrating assembly overhead outlet is in flow communication only with said dip pipe in said cleansing fluid surge chamber.

6. The apparatus of claim 5 wherein said recirculating means recirculates fluid from said cleansing fluid surge chamber to only said second decanting chamber and said inlet chamber.

7. The apparatus of claims 3 or 5 wherein said concentrating assembly further comprises:
a plurality of cyclones, said cyclones adapted to separate coarse cuttings from fine cuttings in an incoming fluid stream from said first decanting chamber, said cyclones each formed having an inlet port for receiving a fluid stream from said first decanting chamber, an overhead outlet port for discharging fluid containing fine drill cuttings and a bottom outlet port for discharging fluid containing coarse drill cuttings to said concentrating assembly bottoms chamber;
an inlet manifold in flow communication with said first decanting chamber, said manifold having branches connected to all said inlet ports of said cyclones; and,
a plurality of valves one of each of said valves disposed in a branch of said manifold for selectively modulating inlet flow to each of said cyclones.

8. The apparatus of claim 7 wherein:
said concentrating assembly bottoms chamber further contains:
an upwardly inclined extension having a sloped bottom;
a discharge chute at the upper end of said upwardly sloping extension; and
said removal means including a conveyor, for moving drill cuttings along said bottoms chamber and for carrying said cuttings upward along said inclined extension of said concentrating assembly bottoms chamber to said discharge chute.

9. The apparatus of claim 8 wherein:
said conveyor is driven by a variable speed drive.

10. The apparatus of claim 8 wherein:
said concentrating assembly bottoms chamber is formed having an elongated opening in its bottom;
a fine mesh secured to the bottom of said concentrating assembly bottoms chamber, thereby covering said elongated opening;
a plenum chamber, said plenum chamber secured to the underside of said concentrating assembly bottoms chamber and surrounding said elongated opening;
vacuum pump means for reducing pressure in said plenum thereby drawing fluid through said mesh and retaining drill cuttings on said screen and for circulating fluid drawn through said screen into said cleansing fluid surge chamber.

11. The apparatus of claim 10 wherein said pumping means is a sump pump mounted within said first decanting chamber, said sump pump having a inlet near the bottom of said first decanting chamber.

12. The apparatus of claim 11 wherein said first decanting chamber further contains:
a plurality of first gas spargers mounted above said inlet of said sump pump, whereupon when gas is liberated from said first gas spargers bubbles are formed which aid in bringing drilling fluid to the top of said first decanting chamber; and
a shroud disposed between said gas spargers and said inlet of said sump pump thereby preventing bubbles generated by said gas spargers from entering said sump pump.

13. The apparatus of claim 12, wherein said second decanting chamber further contains:
a vertical partition wall thereby dividing said second decanting chamber into a primary subchamber and a secondary subchamber;
a second adjustable weir in said vertical partition wall for permitting fluid communication between said primary and secondary subchambers at preselected fluid levels.

14. The apparatus of claim 13 wherein:
said upper section of said inlet chamber is frusto-conical;
said inlet chamber is formed having a tangential inlet;
said inlet chamber is disposed substantially within said primary subchamber and extends upwardly beyond said primary subchamber; and,
said first decanting chamber is disposed substantially within said secondary subchamber and extends upwardly beyond the top of said secondary subchamber.

15. The apparatus of claim 14 wherein said primary subchamber further contains:
a plurality of second gas spargers, to generate gas sparger bubbles to aid in bringing fine drill cuttings and oil contaminant to the top of said primary subchamber;
a primary subchamber liquid spray nozzle assembly disposed along the bottom of said primary subchamber along a longitudinal wall of said primary subchamber and having a plurality of first nozzles disposed at varying distances from said longitudinal wall thereby effectively preventing settlement of fine drill cuttings along the bottom of said primary subchamber and promoting the upward movement of said fine drill cuttings; and,
said recirculating means is in flow communication with said primary subchamber liquid spray nozzle assembly.

16. The apparatus of claim 15 wherein said secondary subchamber further contains:
a plurality of third gas spargers whereupon when gas is liberated from said gas spargers bubbles are formed which aid in bringing fine drill cuttings, oil and drilling fluid to the top of said secondary subchamber;

a secondary subchamber liquid spray nozzle assembly disposed along the bottom of said secondary subchamber along a longitudinal wall of said secondary subchamber and having a plurality of second nozzles disposed at varying distances from said longitudinal wall thereby effectively preventing settlement of fine drill cuttings along the bottom of said secondary subchamber and promoting the upward movement of said fine drill cuttings; and said recirculating means is in flow communication with said secondary subchamber liquid spray nozzle assembly.

17. The apparatus of claim 16 wherein said base further contains:

a blower for compressing air; and, a manifold connected to said blower for directing said compressed air to said first, second and third gas spargers.

18. The apparatus of claim 17 wherein said recirculating means is a horizontal centrifugal pump.

19. The apparatus of claim 18 wherein said upper segment of said inlet chamber further contains:

a plurality of third nozzles said third nozzles disposed circumferentially along the bottom of said frusto-conical shaped upper segment adjacent said sloping outlet segment of said inlet chamber, said third nozzles oriented radially inward toward the vertical axis of said frusto-conical upper section and said third nozzles oriented downwardly at an angle corresponding to the slope in said sloping outlet segment; and, said horizontal centrifugal pump is in flow communication with said third nozzles, whereupon fluid flow through said third nozzles, incoming drilling fluid contaminated drill cuttings are mixed with said recirculating fluid from said third nozzles thereby cleansing the drilling fluid from the drill cuttings and urging the drill cuttings into said first decanting chamber.

20. The apparatus of claim 19 wherein said drain trough assembly further includes:

a rectangular drain trough extending near the top and around the inner periphery of said primary and secondary subchambers said rectangular drain trough having a bottom which slopes downwardly from said primary subchamber to said secondary subchamber; and, a circular drain trough extending around the upper outer periphery of said first decanting chamber said circular drain trough disposed at a higher elevation than said rectangular drain trough and partially overlaying said rectangular drain trough, whereupon drilling fluid collected in said circular drain trough can drain into said rectangular drain trough.

21. The apparatus of claim 20, wherein said housing further contains:

a defrothing chamber, said defrothing chamber located adjacent said secondary subchamber and is in flow communication in two locations with said rectangular drain trough, said defrothing chamber further contains:

a pair of opposed sloped surfaces forming a valley, whereupon drilling fluid from said rectangular trough enters said defrothing chamber at the top of each said sloped surface;

a progression of steps disposed on top of said opposed sloped surfaces;

a drilling fluid outlet disposed in said valley to conduct recovered drilling fluid from said apparatus; and, an air vent mounted on a defrothing chamber wall.

22. The apparatus of claim 21, further containing:

an oil skimmer in said concentrating assembly bottoms chamber;

a third adjustable weir mounted in a common wall between said concentrating assembly bottoms chamber and said primary subchamber thereby permitting fluid communication therebetween at preselected levels;

a chopper mechanism at the inlet to said sump pump for chopping large drill cuttings before they enter said sump pump; and a resilient liner in said chamber, said resilient liner having an affinity for oil found in the drilling fluid thereby promoting separation of said drilling fluid from said drill cuttings.

23. An apparatus for cleansing a stream of drilling fluid fouled drill cuttings with a cleaning fluid comprising:

a unitary base;

a housing mounted on said base, said housing having a plurality of chambers;

a cleansing fluid in said housing;

centrifugal means forming a substantially frusto-conical shaped first chamber in said housing for imparting a spinning action to an incoming stream of drilling fluid fouled drill cuttings thereby mixing said incoming stream with said cleansing fluid;

a first decanting means forming a substantially cylindrical second chamber in said housing for mixing the stream of fouled drill cuttings from said centrifugal means with a cleansing fluid and for substantially separating drilling fluid from the drill cuttings, said first decanting means producing a decanting overflow stream, and a decanting underflow stream wherein lighter drilling fluid can exit with said decanting overflow stream and the drill cuttings and the cleansing fluid can exit with said decanting underflow stream;

separating means for separating said decanting underflow stream into a clean fluid stream and a bottoms fluid stream, said clean fluid stream containing fine drill cuttings and said bottoms fluid stream containing coarse drill cuttings;

cuttings discharge means forming a third chamber in said housing for receiving said bottoms fluid stream and for moving cuttings from said bottoms fluid stream and discharge such cuttings from the apparatus and for storing said remaining bottoms fluid;

a second decanting means forming a substantially rectangular fourth chamber in said housing for separating fine drill cuttings and drilling fluid contained in said clean fluid stream from the cleansing fluid in said stream, said substantially cylindrical second chamber and said frusto-conical first chamber nested substantially within said fourth chamber;

recirculating means for recirculating said stored remaining bottoms fluid to said centrifugal means and said second decanting means for reuse;

drilling fluid discharge means adjacent the upper end of said substantially cylindrical second chamber and said substantially rectangular fourth chamber for removing drilling fluid and fine cuttings entrained therein from said second decanting means and said first decanting means and discharging the drilling fluid and fine cuttings entrained therein from the apparatus.

24. The apparatus of claim 23, wherein said recirculating means directs said stored remaining bottoms fluid only to said centrifugal means and to said second decanting means.

25. The apparatus of claim 23 further including:
gas sparge means in said first and second decanting means for generating gas bubbles thereby promoting movement of drilling fluid and entrained fine drill cuttings toward said drilling fluid discharge means.

26. The apparatus of claim 25, further including: said stored remaining bottoms fluid is a substantially cleansed fluid;
liquid spray means connected to said recirculation means, said liquid spray means mounted in said second decanting means and in said centrifugal means for mixing cleansed fluid from said recirculating means with drilling fluid fouled drill cuttings.

27. The apparatus of claim 26, further including:
defrothing means for defrothing drilling fluid from said drilling fluid discharge means before the drilling fluid exits from the apparatus.

28. The apparatus of claim 27 wherein said cuttings discharge means further includes:
conveyor means mounted in said third chamber for removing drill cuttings from the apparatus.

29. The apparatus of claim 28, wherein said cuttings discharge means further includes:
a screen in the bottom of said third chamber; and
vacuum filter means for attracting and retaining drill cuttings to said screen;
whereupon said conveyor means scraping the retainer drill cuttings along said screen and out of said apparatus.

* * * * *